(12) United States Patent
Mehrotra et al.

(10) Patent No.: US 7,336,801 B2
(45) Date of Patent: Feb. 26, 2008

(54) SYSTEM AND METHOD FOR OBTAINING IMAGE-BASED PRODUCTS FROM A DIGITAL MOTION PICTURE SOURCE

(75) Inventors: Rajiv Mehrotra, Rochester, NY (US); Jose M. Mir, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 492 days.

(21) Appl. No.: 11/016,008

(22) Filed: Dec. 17, 2004

(65) Prior Publication Data

US 2006/0147179 A1   Jul. 6, 2006

(51) Int. Cl.
*G06K 9/00* (2006.01)

(52) U.S. Cl. .................. 382/100; 705/27; 725/60; 715/722

(58) Field of Classification Search ............ 382/100; 705/75, 80, 1, 26, 27; 725/60; 715/722
See application file for complete search history.

(56) References Cited

U.S. PATENT DOCUMENTS

| | | | | |
|---|---|---|---|---|
| 5,053,956 | A | | 10/1991 | Donald et al. ............... 364/401 |
| 5,451,998 | A | | 9/1995 | Hamrick ...................... 348/13 |
| 5,845,263 | A | * | 12/1998 | Camaisa et al. ............. 705/27 |
| 5,890,135 | A | * | 3/1999 | Powell ......................... 705/14 |
| 6,032,130 | A | | 2/2000 | Alloul et al. ................. 705/27 |
| 6,266,650 | B1 | | 7/2001 | Sugaya et al. ................ 705/27 |
| 6,760,916 | B2 | * | 7/2004 | Holtz et al. ................... 725/34 |
| 6,950,198 | B1 | * | 9/2005 | Berarducci et al. ........ 358/1.12 |
| 2004/0006509 | A1 | * | 1/2004 | Mannik et al. ............... 705/14 |
| 2004/0199435 | A1 | * | 10/2004 | Abrams et al. ............... 705/27 |
| 2005/0193425 | A1 | * | 9/2005 | Sull et al. .................. 725/135 |
| 2005/0197960 | A1 | * | 9/2005 | Daum et al. .................. 705/52 |

* cited by examiner

*Primary Examiner*—Bhavesh M Mehta
*Assistant Examiner*—Anand Bhatnagar
(74) *Attorney, Agent, or Firm*—Stephen H. Shaw; Peyton C. Watkins

(57) ABSTRACT

Image-based products are obtained from a digital motion picture source by utilizing a content playing and display system for (a) displaying a sequence of motion picture image frames from a digital motion picture image source containing motion picture contents, and (b) selecting one or more of the image frames for an image-based product and obtaining a unique frame identification for said one or more selected frames; a content management system that (a) utilizes the unique frame identification and determines whether at least one permissible image-based product can be made from said one or more selected frames, and (b), if a permissible image-based product may be made as determined, obtains file data corresponding to said one or more selected frames from a digital source file containing source information corresponding to the motion picture contents; an order management system for preparing order information for the permissible image-based product from the file data; and an order fulfillment system for generating the image-based product from the file data according to the order information.

16 Claims, 3 Drawing Sheets

SYSTEM AND METHOD FOR OBTAINING IMAGE-BASED PRODUCTS FROM A DIGITAL MOTION PICTURE SOURCE

FIELD OF THE INVENTION

The invention relates generally to the field of motion picture imaging, and in particular to the production of imaging products from digitized entertainment contents stored in a digital medium.

BACKGROUND OF THE INVENTION

DVD is a popular medium for the distribution of commercial and entertainment content. Often, it is desirable to isolate certain image frames in order to generate a commercial transaction. For example, in U.S. Pat. No. 6,266,650, "Mail Order Shopping System, and DVD and Adaptor Both for Use in the Mail-Order Shopping System", a mail order shopping system allows a user to do electronic mail-order shopping by isolating specific frames on a DVD-based catalog. The display screen then shows catalog information necessary for placing an order. Once an order is established, a telephone connection is automatically made from the customer using the DVD reproduction apparatus to a mail order firm and the order information is downloaded to the mail order firm.

U.S. Pat. No. 5,053,956 discloses a system for retail trading including a video disc image storing arrangement for storing images of items being traded (e.g., carpets), an image index arrangement connected with the storing arrangement and containing identifiers for the images on the video disc, and an image retrieval arrangement and display means (e.g., a video screen) for displaying retrieved images. In a transaction specifying mode, the identifier for the currently displayed image is automatically input from the index arrangement into an output arrangement as part of a transaction record, which contains the customer, order and delivery data.

U.S. Pat. No. 6,032,130 describes an electronic purchasing system offering multimedia product catalogs including transmitted and locally-stored data, which together allow real-time multimedia product presentations and instant online product ordering. Real-time product information is presented to the customer, using motion and still images, sound and text. The system also provides CD-ROM multimedia catalogs for use on customers' multimedia personal computers, at home or at their office. The home or office PC then communicates with a server via a modem in order to receive the transmitted data and to engage in transactions.

A characteristic of the foregoing systems is that the images on the CD-ROM or DVD show pictures of products that may be selected and ordered. Generally, the images themselves are not for sale, although there would ordinarily be no objection to running off a screen print of a given CD-ROM or DVD image—perhaps to use as a reminder to help in making a decision about the pictured product. However, there are occasions where the imagery may itself be the product—for example, where an Internet-enabled server contains stock images that are for use and/or sale. Generally, these images are still images, which are selected and used for their image content. It would be useful to have a system for selecting individual frames or multi-frame segments of a motion picture for use in connection with other image-based products.

For instance, a variety of professional motion picture contents are commercially available and distributed on various media in digital form. Examples include DVDs or CDs for feature length movie titles, music videos, interactive video games, sporting events, to name a few. Digital files of such professional motion picture contents are also distributed via Internet. These commercially distributed digital motion picture contents are copyright protected. It would be desirable to have a system that allows a consumer who is viewing the professional motion picture contents to be able to legally obtain permissible and desired hardcopy of softcopy images from the motion picture contents.

SUMMARY OF THE INVENTION

The present invention is directed to overcoming one or more of the problems set forth above. Briefly summarized, according to one aspect of the present invention, a method for obtaining image-based products from a digital motion picture source comprises the steps of: (a) displaying a sequence of motion picture image frames from a digital motion picture image source containing motion picture contents; (b) selecting one or more of the image frames for an image-based product and obtaining a unique frame identification for said one or more selected frames; (c) utilizing the unique frame identification to determine whether at least one permissible image-based product can be made from said one or more selected frames; (d) if a permissible image-based product may be made as determined from step (c), obtaining file data corresponding to said one or more selected frames from a digital source file containing source information corresponding to the motion picture contents; (e) preparing order information for the permissible image-based product from the file data; and (f) generating the image-based product from the file data according to the order information.

From another aspect of the present invention, a system for obtaining image-based products from a digital motion picture source comprises: a content playing and display system for (a) displaying a sequence of motion picture image frames from a digital motion picture image source containing motion picture contents, and (b) selecting one or more of the image frames for an image-based product and obtaining a unique frame identification for said one or more selected frames; a content management system that (a) utilizes the unique frame identification and determines whether at least one permissible image-based product can be made from said one or more selected frames, and (b), if a permissible image-based product may be made as determined, obtains file data corresponding to said one or more selected frames from a digital source file containing source information corresponding to the motion picture contents; an order management system for preparing order information for the permissible image-based product from the file data; and an order fulfillment system for generating the image-based product from the file data according to the order information.

It is an advantage of the system that a consumer who is viewing the professional motion picture contents is able to legally obtain permissible and desired hardcopy, or other image-based products, of softcopy images from the motion picture contents, while the usage of the contents is under the active control of the owner/manager of the contents.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image-based storage systems employing digital media, e.g., DVDs, are well known, the present description will be directed in particular to elements forming part of, or cooperating more directly with, a system and method in accordance with the present invention. Elements not specifically shown or described herein may be selected from those known in the art. Certain aspects of the embodiments to be described may be provided in software. Given the system and method as shown and described according to the invention in the following materials, software not specifically shown, described or suggested herein that is useful for implementation of the invention is conventional and within the ordinary skill in such arts.

Figure 1:
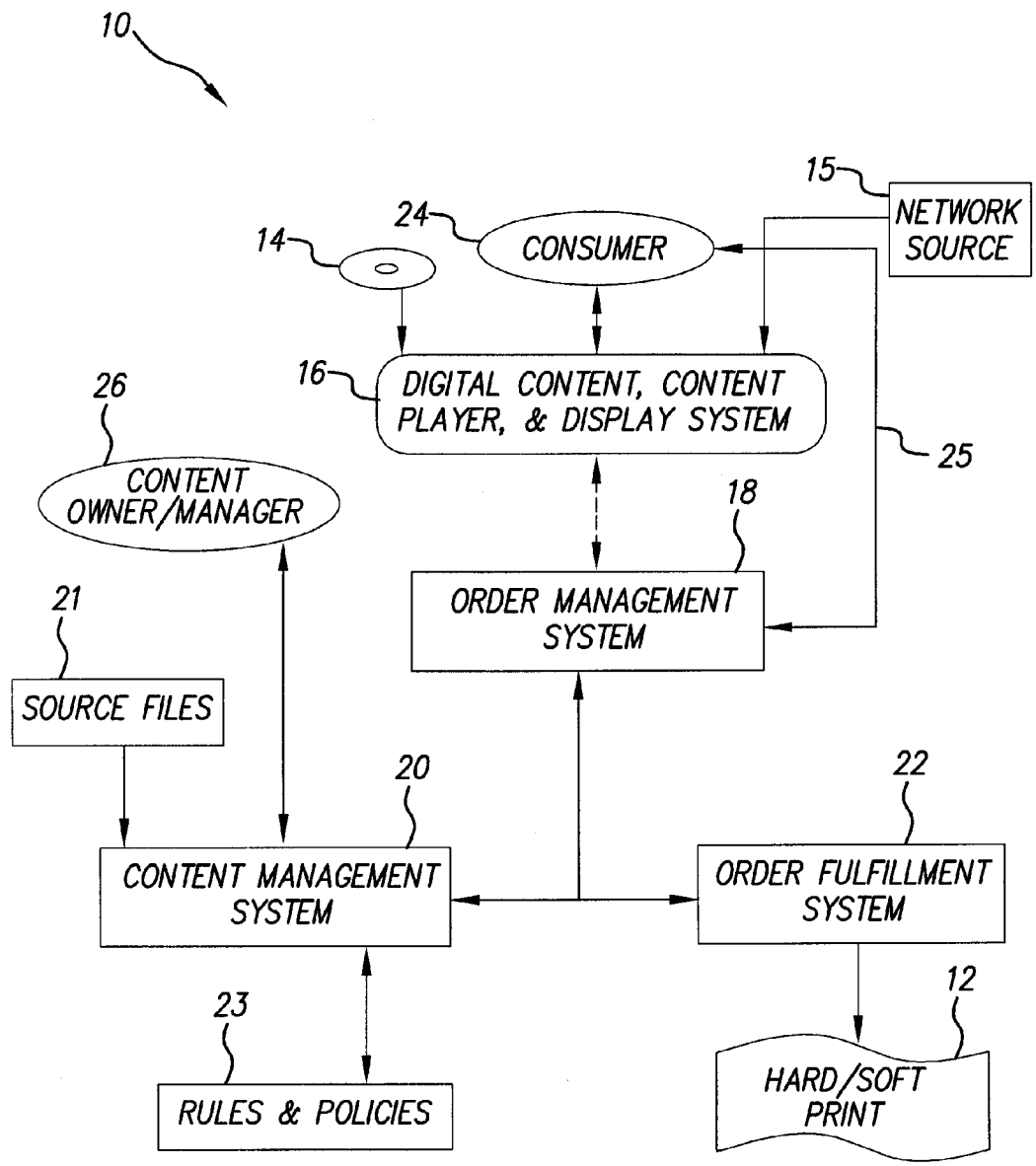
FIG. 1 illustrates a system according to the invention for obtaining image-based products from a digital motion picture source.

Referring first to FIG. 1, a system 10 is shown for obtaining image-based fulfillments, hereinafter referred to as image-based products 12, from a digital motion picture source 14, such as a DVD or CD having a motion picture recorded thereon. Alternatively, the digital motion picture source 14 could be obtained as a digital signal over a network connection 15, such as from an internet-enabled source or from some other external storage source. The image-based products 12 include without limitation such products as one or more hard-copy prints, soft-copy images (e.g., screensaver images), posters, sticker images, clothing with images printed thereon (e.g., on t-shirts), objects with images printed thereon (e.g., on coffee mugs, mousepads), and so on. The system 10 comprises several functionally distinct component systems, including a digital content, content player and display system 16, an order management system 18, a content management system 20 and an order fulfillment system 22. The system 10 also involves a consumer 24, who selects permissible image-based products 12 that may be generated from the digital motion picture source 14, and a content owner/manager 26, who controls the attributes of the image-based products 12. Such attributes include a specification of the products, i.e., the permissible products, that the consumer 24 can obtain from the digital motion picture source 14. Depending on the rules and policies established by the content owner/manager 26, the consumer 24 will be limited as to the type of permissible products that may be obtained from the motion picture source, and as to other attributes of the permissible products, such as quantity and price. The component systems 16, 18, 20 and 22 will now be described in more detail.

Digital Content, Content Player, and Display System 16—In order for a consumer 24 to be able to order an image-based product from a professional motion picture title, the consumer must have access to the digital content and be able to view the content so as to select individual frames or motion picture segments (a short sequence of frames) for desired products. The digital content formatting and/or the content player allow the consumer 24 to obtain a unique identification for each selected frame. Examples of unique frame identification include without limitation frame numbers, time codes, and scene number. Most DVD players, CD players, and soft video file players (e.g., a Quicktime player, MS Media player, and/or a RealPlayer) allow a user to pause the content display and obtain the frame number or time code of the frame at which the content display pauses. In some cases, the video may pause at a specific frame (e.g., at an I frame in case of an MPEG encoded digital video) of a scene and not at a desired or selected frame. Some motion image content players allow a user to frame-by-frame step forward or backward from the paused frame.

Accordingly, for the purpose of this invention, the digital content, content player and content display system 16 is any system that can be used to view motion picture content and obtain a unique identification for a selected frame or a representative frame for a desired motion picture scene comprising of a sequence of adjacent frames. A variety of systems employing content players and/or content display devices suitable for this application are available and new ones are increasingly becoming available. Examples of such systems include without limitation a DVD/CD player combined with a TV display; a DVD/CD player combined with a computer (and its monitor display); a computer with digital video storage or connection with a video server, video cards, and display monitors; a digital video game console with a display monitor; a portable DVD/CD player; and a wireless device, like a PDA or a cell phone, with a video storage and/or an internet connection and video displaying capabilities.

Content Management System 20—The content management system 20 stores and manages digital source files 21 for professional motion picture contents available for fulfillment, that is, available for certain desirable uses as, or in connection with, an image-based product. The image resolution, data encoding, and format of the motion picture digital source file 21 should be suitable for extraction of elements or file segments needed for the permissible products. These elements and file segments are static image frames and a sequence of image frames, respectively. For every motion picture content element or file segment, there are associated rules and policies 23 for content management including without limitation copyright enforcement, rights management, content protection, content license, and the configuration of permissible products that may be obtained from a particular element or file segment. These rules and policies 23 are also stored and managed by the content management system 20. A content owner/manager 26 can change the content management rules and policies 23 associated with the content owner/manager's motion picture contents anytime and such changes may dynamically change the permissible products, the product cost, and so on.

The image element or file segment needed for a particular product can be extracted from the source file 21 and processed with image processing and enhanced processing techniques to generate the image data suitable for the chosen product. Alternatively, the content manager 20 can extract and process a priori all the elements and file segments needed for all the permissible products. These extracted and processed elements and file segments are then properly indexed and stored as ready to use elements and segments. The content management system 20 communicates with the order management system 18 to dynamically evaluate and validate a consumer request with respect to the content management rules and policies. The ability to change the content management rules and policies 23 without requiring any change in the distribution copies of the motion picture content or in the content players provides the flexibility to dynamically modify the offerings of permissible products.

Order management system 18—The order management system interacts with the consumer 24 of the professional motion picture contents and with the content management system 20 to compile a fulfillment order from the consumer for one or more permissible products. While the order management system 18 may take a variety of forms, in the preferred embodiment the order management system is a web-based system that can interact with a consumer 24 via an Internet or an automated voice (phone) communication connection 25. A consumer 24 can access the order management system 18 by connecting to the order processing website via the Internet connection or a phone call. The Internet connection can be established from an Internet-enabled content player or content display device 16, or an Internet-enabled computing or communication device. For a unique element or file segment identifier provided by a consumer 24 from specified motion picture contents, the order management system 18 obtains data regarding the corresponding permissible products from the content management system 20 and communicates the data to the consumer 24.

For a compiled order for a permissible product, interactions among the content management system 20, the order management system 18, and the order fulfillment system 22 ensure that a fulfillment order with an appropriate image file is made available to the order fulfillment system 22. The content management system 20 generates and supplies the required image file and can optionally embed content protection rules in the image file to prevent unauthorized usage. The order management system 18 obtains order status reports, e.g., shipping dates and the like, from the order fulfillment system 22 for communication with the consumer 24. The order management system 18 also handles commercial transactions with the consumer 24.

Figure 2A:
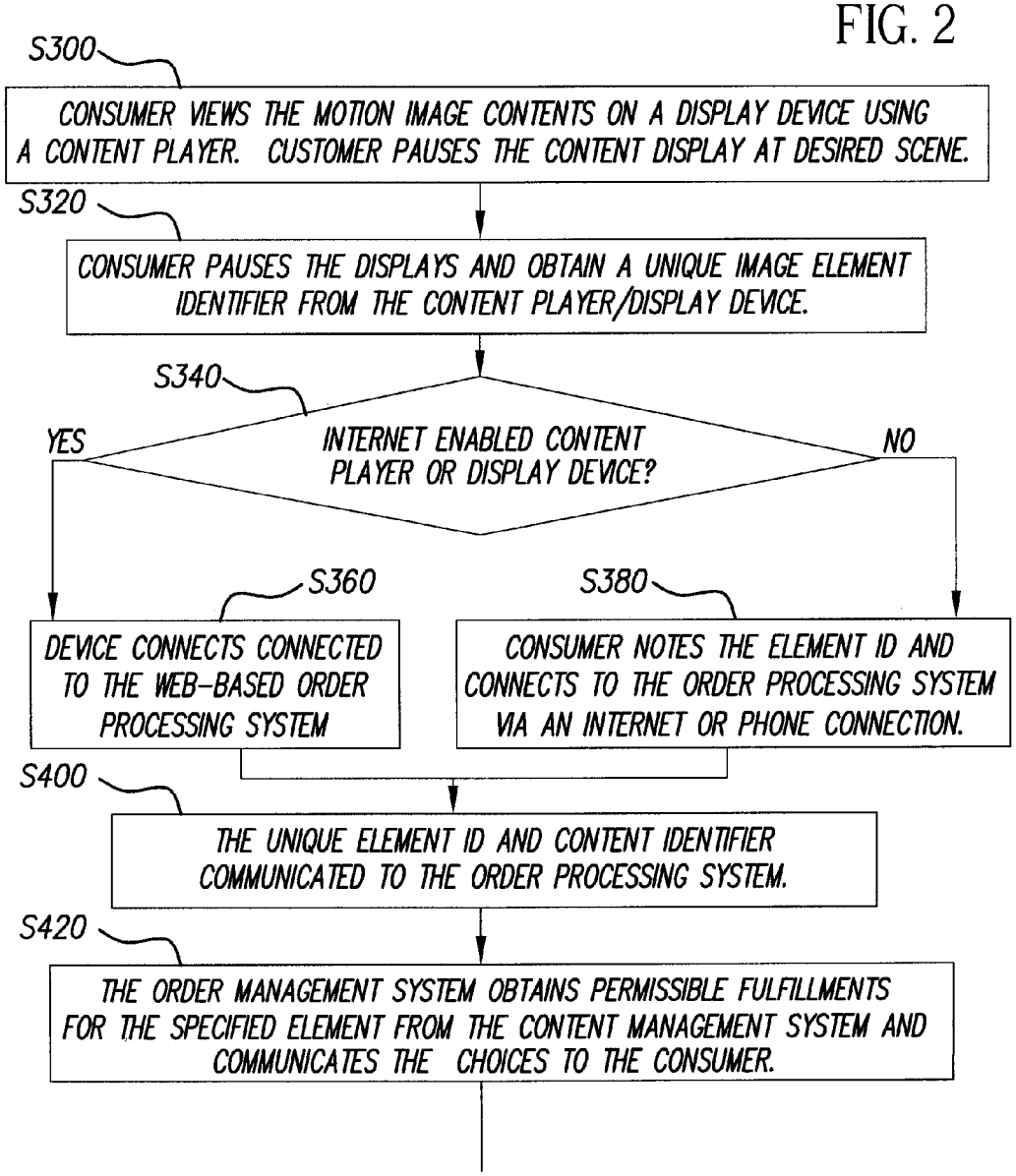
FIGS. 2A and 2B show the steps of a process for generating and processing an order for an image-based product within the system shown in FIG. 1.
Figure 2B:
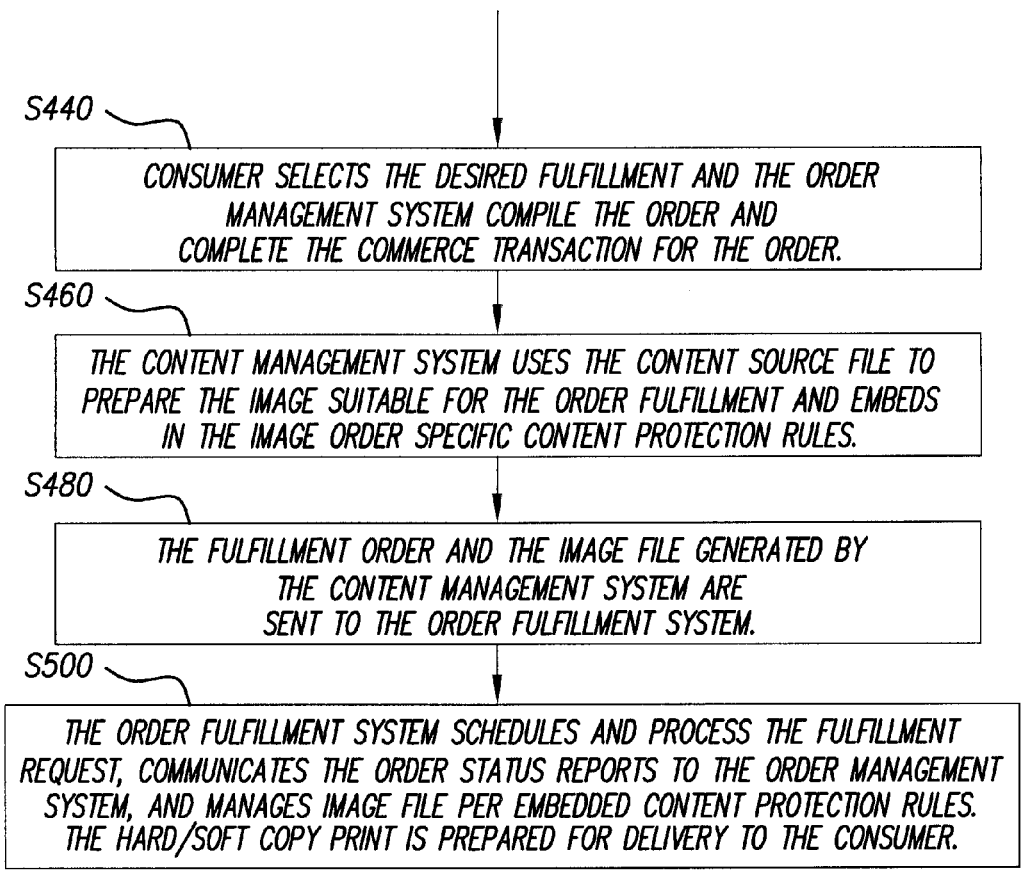

Order Fulfillment System 22—While the order fulfillment system 22 may involve many different processes, a particular process to compile and execute a fulfillment order is shown without limitation in FIGS. 2A and 2B. Basically the order fulfillment system is responsible for scheduling, generating and processing orders for image-based products. In brief, it receives each fulfillment order with the associated image file, and the order is scheduled for processing. The hardcopy or softcopy fulfillment 12 is produced for delivery to the consumer. After processing an order, the associated image files are managed (i.e., temporarily stored or destroyed) per the embedded content protection rules. The order fulfillment system also sends the status update on every order to the order management system.

FIGS. 2A and 2B shows a typical workflow for generating and processing a fulfillment order, where the functional subsystems described earlier can interact in several different ways to compile and process an order. (One possible of set of interactions is shown in FIG. 1). The workflow starts with a consumer viewing the professional motion picture contents on a display device (S300) and pausing the display at a desired frame or scene to obtain the corresponding unique element identifier (S320) for that frame or scene. The consumer can elect to note or store all the desired unique element identifiers while viewing the contents and defer order placement for later or can interact with the order management system 18 during the viewing of the content. In order to place a fulfillment order, the consumer connects to the order management server via an Internet connection (S340). This connection may be made via an Internet-enabled content player or display device, thereby enabling interaction with the order management system 18 during the viewing of the content (S360). Alternatively, this connection may be made via another Internet-enabled device or a phone or a digital voice communication device after noting or storing all the desired unique element or file segment identifiers while viewing the contents (S380). After connecting to the order management system, the consumer provides a content identifier (e.g., a movie title or a DVD serial number) and a unique element or file segment identifier (S400).

The order management system then communicates with the content management system 20 to obtain the permissible products for the identified content and element or file segment. The set of permissible products are communicated to the consumer and/or used to validate a consumer order (S420). A thumbnail image and/or an associated description of the specified element can be optionally provided by the content management system 20 to the order management system 18 to facilitate verification by the consumer. The consumer makes the desired product selection and places an order. The order management system 18 compiles the order and completes the commerce (payment) transaction (S440). An ordered product fulfillment is communicated to the content management system 20, which extracts and processes the appropriate image data to prepare an image file required for the product fulfillment (S460). The processing can involve several image processing and enhancement steps including image enhancement for removing motion artifacts and best possible desired product fulfillment, encoding image data in appropriate resolution and format, and embedding order specific content protection rules in the image file (S460). A fulfillment order and the corresponding image file generated by the content management system 20 are sent to the order fulfillment system 22 (S480). The order fulfillment system 22 schedules and processes the fulfillment request to generate the ordered image-based product 12, communicates the order status reports to the order management system 18, and manages the image file per the embedded content protection rules. The ordered product is prepared for delivery to the consumer. (S500).

The invention has been described with reference to a preferred embodiment. However, it will be appreciated that variations and modifications can be effected by a person of ordinary skill in the art without departing from the scope of the invention.

PARTS LIST 10 system
12 image-based products
14 digital motion picture source
15 network source
16 digital content, content player and display system
18 order management system
20 content management system
21 digital source files
22 order fulfillment system
24 consumer
25 Internet or automated voice communication connection
26 content owner/manager
S300 consumer viewing step
S320 pausing and obtaining element identifier step
S340 internet enabling step
S360 internet-enabled interaction with viewing step
S380 internet-enabled deferred interaction step
S400 content identifier communication step
S420 consumer order validation step
S440 consumer selection and order compiling step
S460 image file preparation step
S480 order and image file transmission step
S500 product fulfillment step

What is claimed is:

1. A method for obtaining image-based products from a digital motion picture source, said method comprising the steps of:
   (a) displaying a sequence of motion picture image frames from a digital motion picture image source containing motion picture contents;
   (b) selecting one or more of the image frames for an image-based product and obtaining a unique frame identification for said one or more selected frames;
   (c) utilizing the unique frame identification to determine whether at least one permissible image-based product can be made from said one or more selected frames;
   (d) if a permissible image-based product may be made as determined from step (c), obtaining file data corresponding to said one or more selected frames from a digital source file containing source information corresponding to the motion picture contents;
   (e) preparing order information for the permissible image-based product from the file data; and
   (f) generating the image-based product from the file data according to the order information.

2. The method as claimed in claim 1 wherein a consumer of said image-based products is involved in performing steps (a) and (b), and an owner/manager of the motion picture contents controls the outcome of steps (c) and (d).

3. The method as claimed in claim 2 wherein the determination of whether at least one permissible image-based product can be made from said one or more selected frames in step (c) is based on predetermined rules and policies maintained by the owner/manager.

4. The method as claimed in claim 3 wherein the rules and policies are changeable by the owner/manager.

5. The method as claimed in claim 1 wherein the file data obtained in step (d) includes at least one of elements and file segments corresponding to static image frames or sequences of image frames, respectively, needed for making the permissible image-based product.

6. The method as claimed in claim 5 wherein said elements and file segments are extracted from the digital source file in response to specification of a particular permissible image-based product in step (c).

7. The method as claimed in claim 5 wherein said elements and file segments are extracted a priori from the digital source file for all permissible image-based products that may be obtained from the digital source file.

8. A system for obtaining image-based products from a digital motion picture source, said system comprising:
   a content playing and display system for (a) displaying a sequence of motion picture image frames from a digital motion picture image source containing motion picture contents, and (b) selecting one or more of the image frames for an image-based product and obtaining a unique frame identification for said one or more selected frames;
   a content management system that (a) utilizes the unique frame identification and determines whether at least one permissible image-based product can be made from said one or more selected frames, and (b), if a permissible image-based product may be made as determined, obtains file data corresponding to said one or more selected frames from a digital source file containing source information corresponding to the motion picture contents;
   an order management system for preparing order information for the permissible image-based product from the file data; and
   an order fulfillment system for generating the image-based product from the file data according to the order information.

9. The system as claimed in claim 8 wherein a consumer of said image-based products is involved in the content playing and display system, and an owner/manager of the motion picture contents controls the operation of the content management system.

10. The system as claimed in claim 9 wherein the determination of whether at least one permissible image-based product can be made from said one or more selected frames is based on predetermined rules and policies maintained by the owner/manager.

11. The system as claimed in claim 10 wherein the rules and policies are changeable by the owner/manager.

12. The system as claimed in claim 9 wherein the order management system is a web-based system that interacts with the consumer via at least one of an Internet connection and an automated voice communication connection.

13. The system as claimed in claim 8 wherein the file data obtained by the content management system includes at least one of elements and file segments corresponding to static image frames or sequences of image frames, respectively, needed for making the permissible image-based product.

14. The system as claimed in claim 13 wherein said elements and file segments are extracted from the digital source file in response to specification of a particular permissible image-based product.

15. The system as claimed in claim 13 wherein said elements and file segments are extracted a priori from the digital source file for all permissible image-based products that may be obtained from the digital source file.

16. The system as claimed in claim 8 wherein the order-fulfillment system communicates order status information to the order management system.

* * * * *